United States Patent
Nikaido et al.

(10) Patent No.: US 7,337,681 B2
(45) Date of Patent: Mar. 4, 2008

(54) HYBRID SENSOR INCLUDING ELECTROSTATIC CAPACITANCE SENSOR

(75) Inventors: Shinichi Nikaido, Sakura (JP); Akira Kamijima, Sakura (JP); Yasushi Nakamura, Sakura (JP); Nobumasa Misaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 119 days.

(21) Appl. No.: 11/121,930

(22) Filed: May 5, 2005

(65) Prior Publication Data
US 2005/0257628 A1 Nov. 24, 2005

(30) Foreign Application Priority Data
May 10, 2004 (JP) ............................. 2004-139518
Oct. 4, 2004 (JP) ............................. 2004-291873

(51) Int. Cl.
*G03G 15/00* (2006.01)

(52) U.S. Cl. .................... 73/862.541; 73/862.041; 73/862.042; 73/862.52

(58) Field of Classification Search .......... 73/862.541, 73/862.041, 862.042, 862.52
See application file for complete search history.

(56) References Cited

U.S. PATENT DOCUMENTS

| | | | | |
|---|---|---|---|---|
| 6,145,384 A | * | 11/2000 | Ikeda et al. | ................... 73/780 |
| 6,927,678 B2 | * | 8/2005 | Fultz et al. | ................. 340/438 |
| 6,980,008 B2 | * | 12/2005 | Teranuma et al. | .......... 324/663 |

FOREIGN PATENT DOCUMENTS

JP 2002-326554 A 11/2002

* cited by examiner

*Primary Examiner*—Edward Lefkowitz
*Assistant Examiner*—Freddie Kirkland, III
(74) *Attorney, Agent, or Firm*—Sughrue Mion, PLLC (57) ABSTRACT

A hybrid sensor is formed by stacking a plurality of flexible sheets each provided with electrode patterns. The hybrid sensor includes a contact pressure sensor which has switches turning on or off by a pressure load, and an electrostatic capacitance sensor which detects a nearby object without contacting the object. The electrode patterns include a switching electrode pattern as the switch of the contact pressure sensor and a detecting electrode pattern as the detecting electrode of the electrostatic capacitance sensor. The detecting electrode is formed to cover substantially the entire area other than the area on which the switching electrode pattern is formed.

7 Claims, 7 Drawing Sheets

HYBRID SENSOR INCLUDING ELECTROSTATIC CAPACITANCE SENSOR

Priority is claimed from Japanese Patent Application No. 2004-139518, filed May 10, 2004, and Japanese Patent Application No. 2004-291873, filed Oct. 4, 2004, the contents of which are incorporated herein by reference.

BACKGROUND OF THE INVENTION

1. Field of the Invention

The present invention relates to a hybrid sensor including an electrostatic capacitance sensor, which detects a nearby object utilizing a variation in electrostatic capacitance, and a contact pressure sensor which detects a load pressure. More particularly, the present invention relates to a hybrid sensor which is fabricated by stacking a plurality of elastic or flexible sheets each of which is provided with electrode patterns.

2. Description of Related Art

Figure 8:
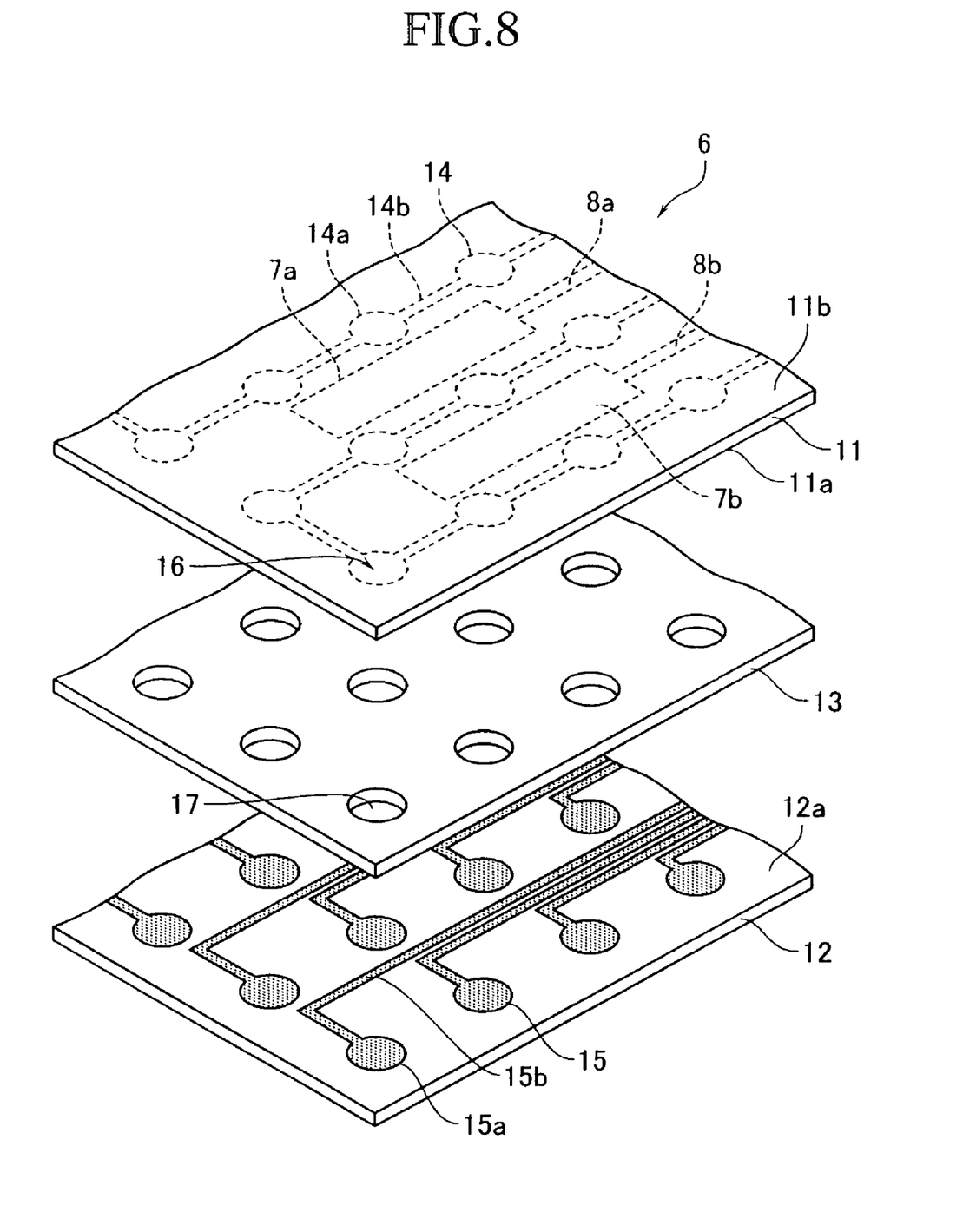
FIG. 8 is a perspective view showing a conventional hybrid sensor.

A hybrid sensor of related art having an electrostatic capacitance sensor and a contact pressure sensor as well as a system utilizing the hybrid sensor for detecting a human body set on a seat of an automobile is disclosed in Japanese Unexamined Patent Application, First Publication, No. 2002-326554, assigned to the same applicant as that of the present application. The hybrid sensor 6 is, as shown in FIG. 8, formed by stacking upper and lower flexible sheets 11 and 12 made of insulating resin film such as polyester film and an insulating sheet 13 positioned therebetween. The flexible sheets 11 and 12 are provided with switching electrode patterns 14 and 15, respectively, on a lower surface 11a of the sheet 11 and an upper surface 12a of the sheet 12 which face each other. The electrode patterns 14 and 15 are formed by screen printing in which a suitable conducting material such as silver paste is deposited. Each of the electrode patterns 14 and 15 includes a plurality of land portions 14a and 15a which are used as switching contacts 16 arranged in a matrix pattern and lead portions 14b and 15b which electrically connect the land portions 14a and 15a to a detecting circuit (not shown). The insulating sheet 13 has a plurality of openings 17 at positions corresponding to the land portions 14a and 15a. Each of the openings 17 has a diameter sufficient to enable one of the land portions 14a to contact the associated one of the land portions 15a. When a pressure load is applied, one or some of the land portions 14a of the upper flexible sheet 11 contact the associated one or some of the land portions 15a of the lower flexible sheet 12 through the openings 17 to make an electrical connection. The hybrid sensor 6 performs the function of the contact pressure sensor by the structural elements described above.

The function of the electrostatic capacitor sensor in the hybrid sensor 6 is achieved by a pair of detecting electrode patterns 7a and 7b formed on the upper flexible sheet 11 on the surface 11a facing the insulating sheet 13. The detecting electrode patterns 7a and 7b are insulated from the switching electrode patterns 14. The electrostatic capacitor sensor thus constructed detects a nearby object without contacting thereto according to a variation in electrostatic capacitance obtained from the detecting electrode patterns 7a and 7b.

According to the above structure, the manufacturing cost for the hybrid sensor can be reduced since the contact pressure sensor and the electrostatic capacity sensor are formed on the same flexible sheets.

However, the hybrid sensor described above inevitably has an insufficient sensitivity to detect the nearby object when the object is relatively far from the sensor. This is because the detecting electrode patterns for the electrostatic capacitance sensor are provided on a relatively small area of the flexible sheet.

SUMMARY OF THE INVENTION

The present invention has been made in view of the above problems. It is, therefore, an object of the present invention to provide a hybrid sensor including an electrostatic capacitance sensor in which a sensitivity to detect a nearby object is improved and, therefore, to realize a hybrid sensor of a high reliance.

According to an exemplary embodiment of the present invention, a hybrid sensor includes a plurality of stacked, flexible sheets. A first sheet of the plurality of flexible sheets includes a switching electrode pattern and a detecting electrode pattern. The detecting electrode pattern substantially covers the entire area of the first sheet.

A second sheet of the plurality of flexible sheets may be an insulating sheet having a plurality of holes therein, and a third sheet of the plurality of flexible sheets may includes a ground electrode pattern. The location of plurality of holes in the second sheet and of the ground electrode pattern of the third sheet may correspond to the location of the switching electrodes on the first sheet. Therefore, when pressure is applied to the first and second sheets, the switching electrodes may contact the ground electrodes through the holes in the second sheet.

The first sheet may further include a guard electrode pattern which is supplied with the same electric potential as is supplied to the detecting electrode pattern. The guard electrode pattern is positioned on the first sheet in order to block parasitic capacitance between the detecting electrode pattern and the switch electrode pattern.

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE INVENTION

Now, exemplary embodiments of the present invention will be described with reference to the drawings.

Figure 1:
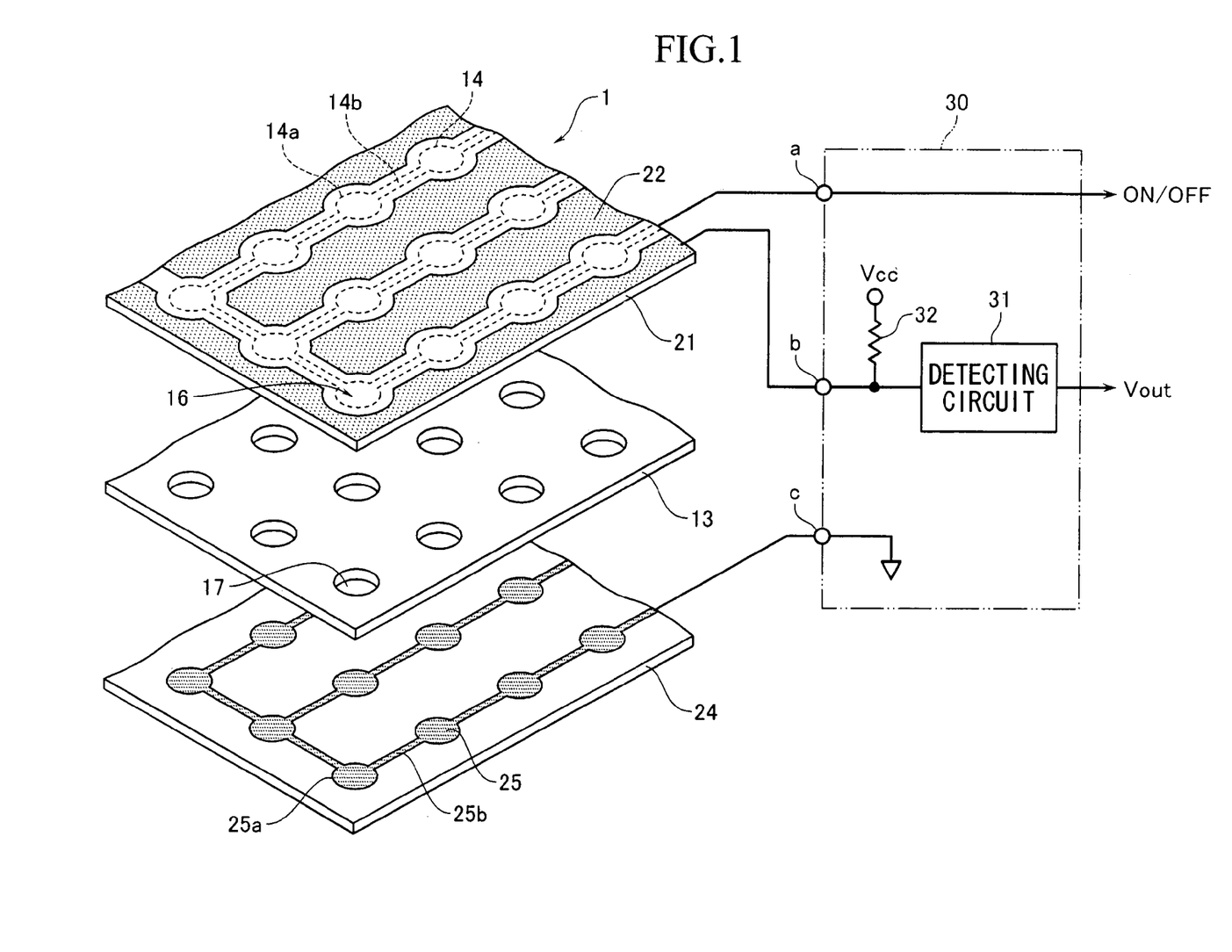
FIG. 1 is a perspective view showing a hybrid sensor according to a first exemplary embodiment of the present invention.
Figure 2:
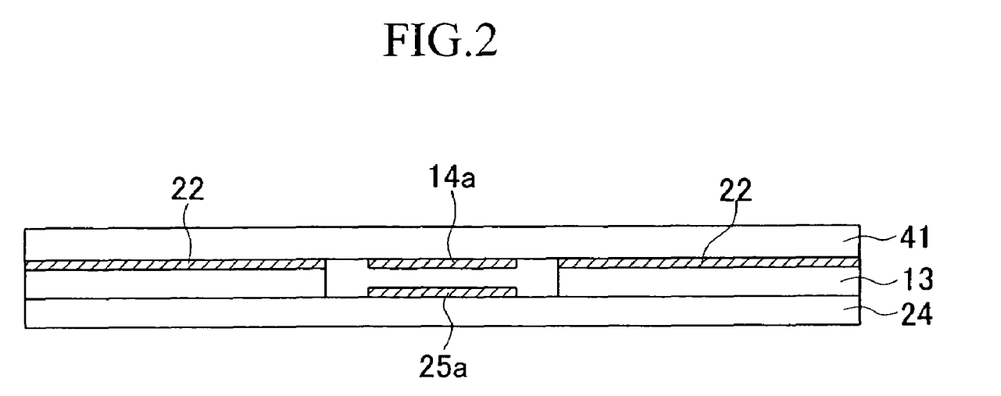
FIG. 2 is a cross-sectional view showing the hybrid sensor according to the first exemplary embodiment of the present invention.

FIGS. 1 and 2 show a hybrid sensor according to a first exemplary embodiment of the present invention. The hybrid sensor 1 includes upper and lower flexible sheets 21 and 24, made of an insulating resin film such as polyester film, and an insulating sheet 13 positioned between the upper and lower sheets 21 and 24. The sheets 13, 21 and 24 are stacked together to form a thin film circuit. The flexible sheet 21 is provided with a switching electrode pattern 14 on a lower surface (in FIGS. 1 and 2) of the sheet 21 which faces the insulating sheet 13. The flexible sheet 24 is provided with a ground electrode pattern 25 on an upper surface (in FIGS. 1 and 2) of the sheet 24 which faces the insulating sheet 13. The switching and ground electrode patterns 14 and 25 are formed by screen printing in which a suitable conducting material such as silver paste is deposited. The switching electrode pattern 14 includes a plurality of land portions 14a, which are used as switching contacts 16 arranged in a matrix pattern, and lead portions 14b which electrically connect the land portions 14a. Similarly, the ground electrode pattern 25 includes a plurality of land portions 25a, which are arranged to face the land portions 14a of the switching electrode pattern 14, respectively, and lead portions 25b which electrically connect the land portions 25a. The insulating sheet 13 has a plurality of openings 17 at positions corresponding to the land portions 14a and 25a. Each of the openings 17 has a diameter sufficient to enable one of the land portions 14a to contact the associated one of the land portions 25a when a pressure load is applied to the sensor 1.

The upper flexible sheet 21 also has a detecting electrode pattern 22 formed on the lower surface (in FIGS. 1 and 2) of the flexible sheet 21 on which the switching electrode pattern 14 is provided. The detecting electrode pattern 22 is formed to cover substantially the entire area other than the area where the switching electrode pattern 14 is formed. Alternately, the detecting electrode pattern 22 may be formed on an upper surface of the flexible sheet 21. The detecting electrode pattern 22 thus formed has a large detecting area which contributes to the detection of a nearby object.

The hybrid sensor 1 is connected to a sensor circuit 30. The ground electrode pattern 25 is grounded via a terminal c of the sensor circuit 30 as a common ground for the contact pressure sensor and the electrostatic capacitance sensor included in the hybrid sensor 1. The switching electrode pattern 14 is connected to a terminal "a" of the sensor circuit 30 to output an ON/OFF signal which turns into a ground (GND) level when there is an electrical connection between the land portions 14a and 25a.

The detecting electrode pattern 22 is connected to an input terminal b of a detecting circuit 31 included in the sensor circuit 30 to detect an electrostatic capacitance. The detecting circuit 31 includes an oscillator which oscillates in response to, for example, a frequency or a duty cycle determined by an electrostatic capacitance between the detecting electrode pattern 22 and the ground, and a low pass filter which integrates the output of the oscillator. A resistance 32 is connected between the input terminal b and a voltage-controlled current source Vcc.

The operation of the hybrid sensor 1 is now described below.

When a pressure load is applied, one or more of the land portions 14a of the switching electrode pattern 14 on the upper flexible sheet 21 contact the associated one or more of the land portions 25a of the ground pattern 25 on the lower flexible sheet 25 through the openings 17 to make an electrical connection. Thus, the potential of the switching electrode pattern 14 turns into the ground level, detecting the pressure load. The hybrid sensor thus functions as a contact pressure sensor.

A parasitic capacitance Co is formed between the detecting electrode pattern 22 and the switching electrode pattern 14 as well as the ground electrode pattern 25 although the electrostatic capacitance generated between those electrode patterns 22, 14 and 25 is not so high since the detecting electrode pattern 22 is not overlapped to the area where the switching electrode pattern 14 and the ground electrode pattern 25 are located. However, when an object reaches the detecting electrode pattern 22, a capacitance Cx generated between the object and the detecting electrode pattern 22 is increased. The object has a ground capacitance which is much greater than the capacitance Cx to be detected so that the potential of the object can be regarded as the ground potential. The total capacitance C of the parasitic capacitance Co and the capacitance Cx due to the nearby object is also increased. The detecting circuit 31 senses a variation in the total capacitance C to detect the nearby object. The hybrid sensor thus functions as an electrostatic capacitor sensor.

As described above, it is possible to add the function of the electrostatic capacitor sensor to the hybrid sensor 1 only by forming the detecting electrode pattern 22 on the upper flexible sheet 21 which is placed to face the object to be detected. The ground electrode pattern 25 may be also used as a common ground both for the detecting electrode pattern 22 and the switching electrode pattern 14. Further, the switching electrode pattern 14 may be formed on the lower flexible sheet 24 while the ground electrode pattern 25 may be formed on the upper flexible sheet 21.

Figure 3:
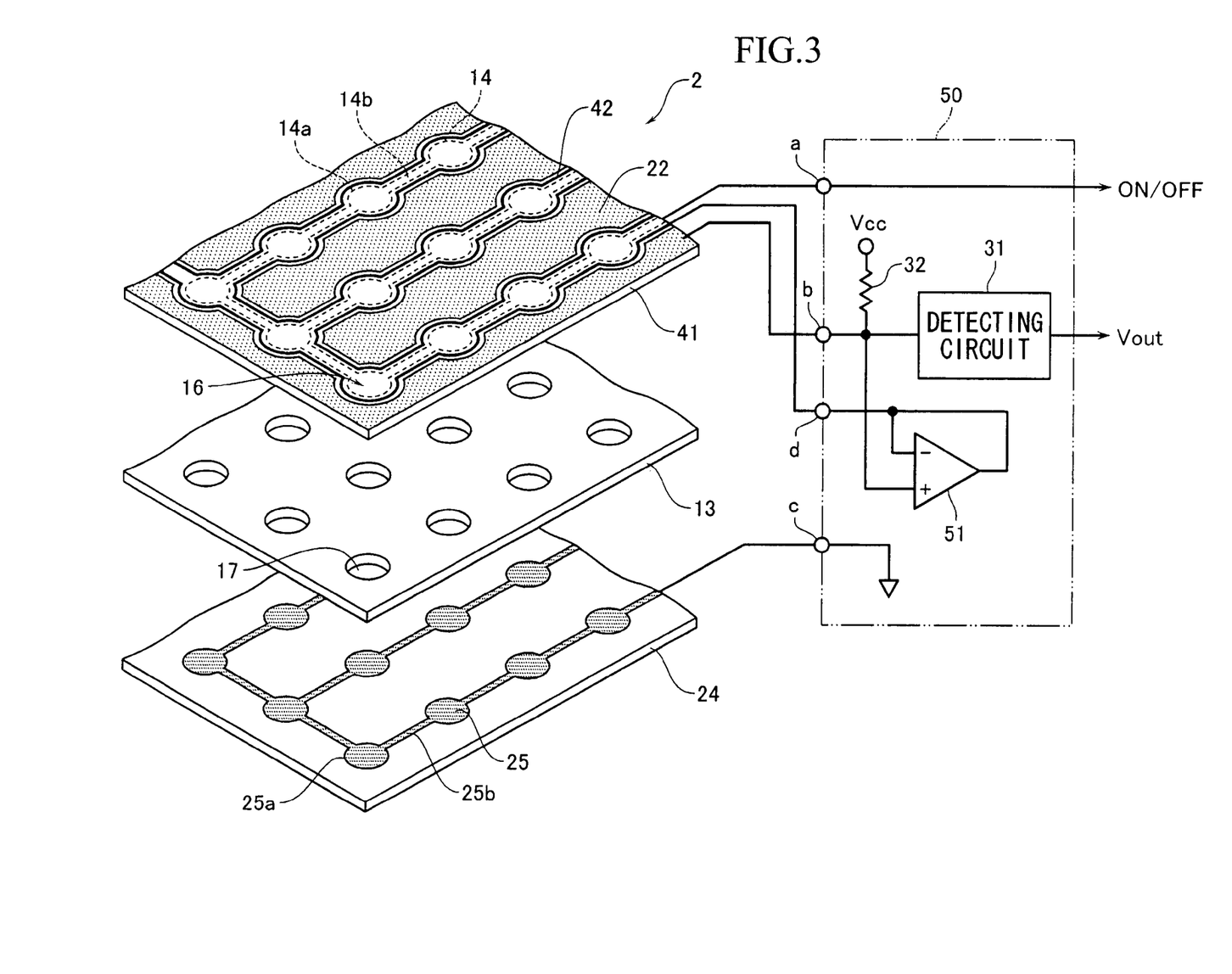
FIG. 3 is a perspective view showing a hybrid sensor according to a second exemplary embodiment of the present invention.
Figure 4:
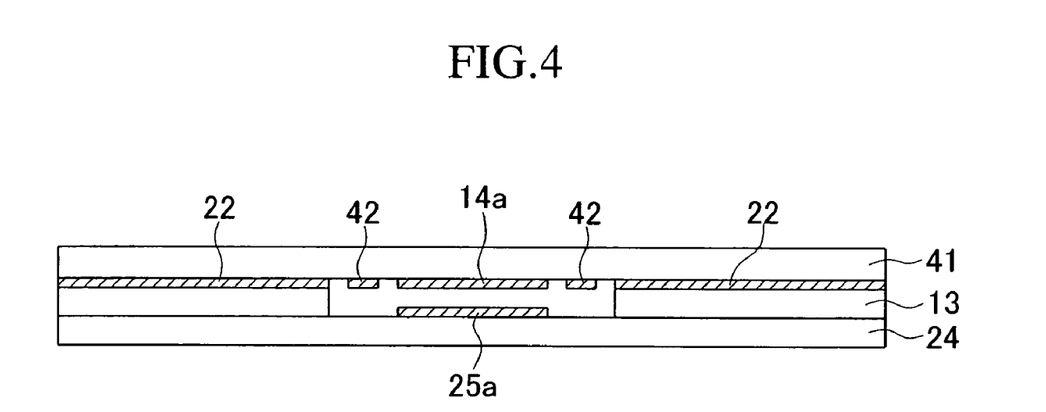
FIG. 4 is a cross-sectional view showing the hybrid sensor according to the second exemplary embodiment of the present invention.

FIGS. 3 and 4 show a second exemplary embodiment of the present invention. Structural elements similar to or the same as the first embodiment bear the same reference numerals and explanations thereof are omitted.

As shown in FIGS. 3 and 4, a hybrid sensor 2 of the second embodiment includes a guard electrode pattern 42 in addition to the structural elements included in the hybrid sensor of the first embodiment shown in FIGS. 1 and 2. The guard electrode pattern 42 is formed on a lower surface (in FIGS. 3 and 4) of an upper flexible sheet 41 so as to locate a space or area between the switching electrode pattern 14 and the detecting electrode pattern 22 and to surround the switching electrode pattern 14. That is, the guard electrode pattern 14, the detecting electrode pattern 22 and the switching electrode pattern 14 are not overlapped in view of the plane of the flexible sheet 41. The guard electrode pattern 42 is supplied with a voltage the same as that supplied to the detecting electrode pattern 22. To this end, a sensor circuit 50 supplies the output voltage from the detecting electrode pattern 22 to the guard electrode pattern 42 through a buffer amplifier 51, which functions as a voltage follower, and a terminal d connected to the guard electrode pattern 42.

According to the above structure, the detecting electrode pattern 22 and the guard electrode pattern 42 always have the same electric potential and, therefore, no electrostatic capacitance is formed therebetween. The parasitic capacitance Co between the detecting electrode pattern 22, the switching electrode pattern 14 and the ground electrode pattern 25 is therefore much reduced. It is, therefore, possible to enlarge the variation in the capacitance Cx generated between the nearby object and the detecting electrode pattern 22 and to increase the sensitivity of the electrostatic capacitance sensor.

Figure 5:
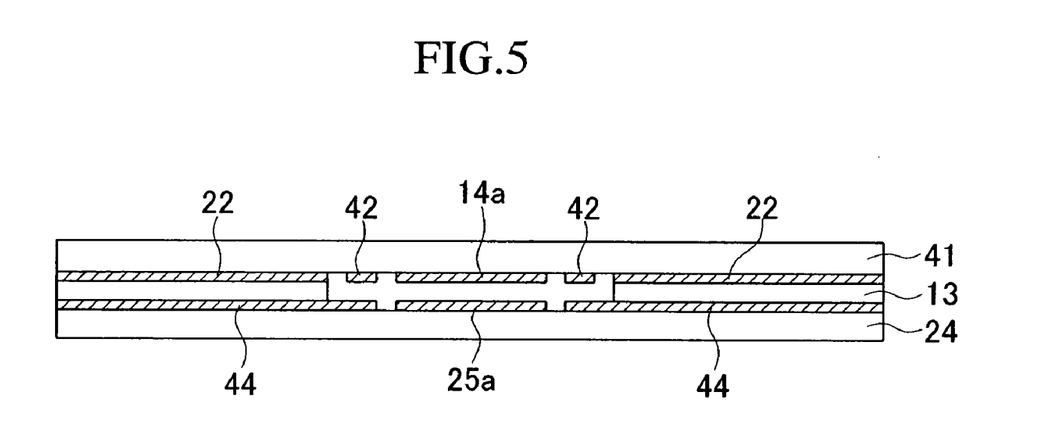
FIG. 5 is a cross-sectional view showing a modification of the hybrid sensor according to the second exemplary embodiment of the present invention.

As shown in FIG. 5, alternately, an additional guard electrode pattern 44 may be formed on the upper surface of the lower flexible sheet 24 in addition to the guard electrode pattern 42. In this case, the guard electrode pattern 44 is formed on the upper surface to cover substantially the entire area other than the area on which the ground electrode pattern 25 is formed so as to surround the ground electrode pattern 25. Since the guard electrode pattern 44 is also formed on the lower flexible sheet 24 which is opposite to the upper flexible sheet 41 facing the nearby object to be detected. This structure makes it possible to prevent misdetection caused by, for example, a noise generated on the lower side (in FIG. 5) of the electrostatic capacitance sensor and a nearby object approaching to the lower flexible sheet 24 from the lower side. Similar to the first embodiment, the switching electrode pattern 14 may be formed on the lower flexible sheet 24 while the ground electrode pattern 25 may be formed on the upper flexible sheet 41.

Figure 6:
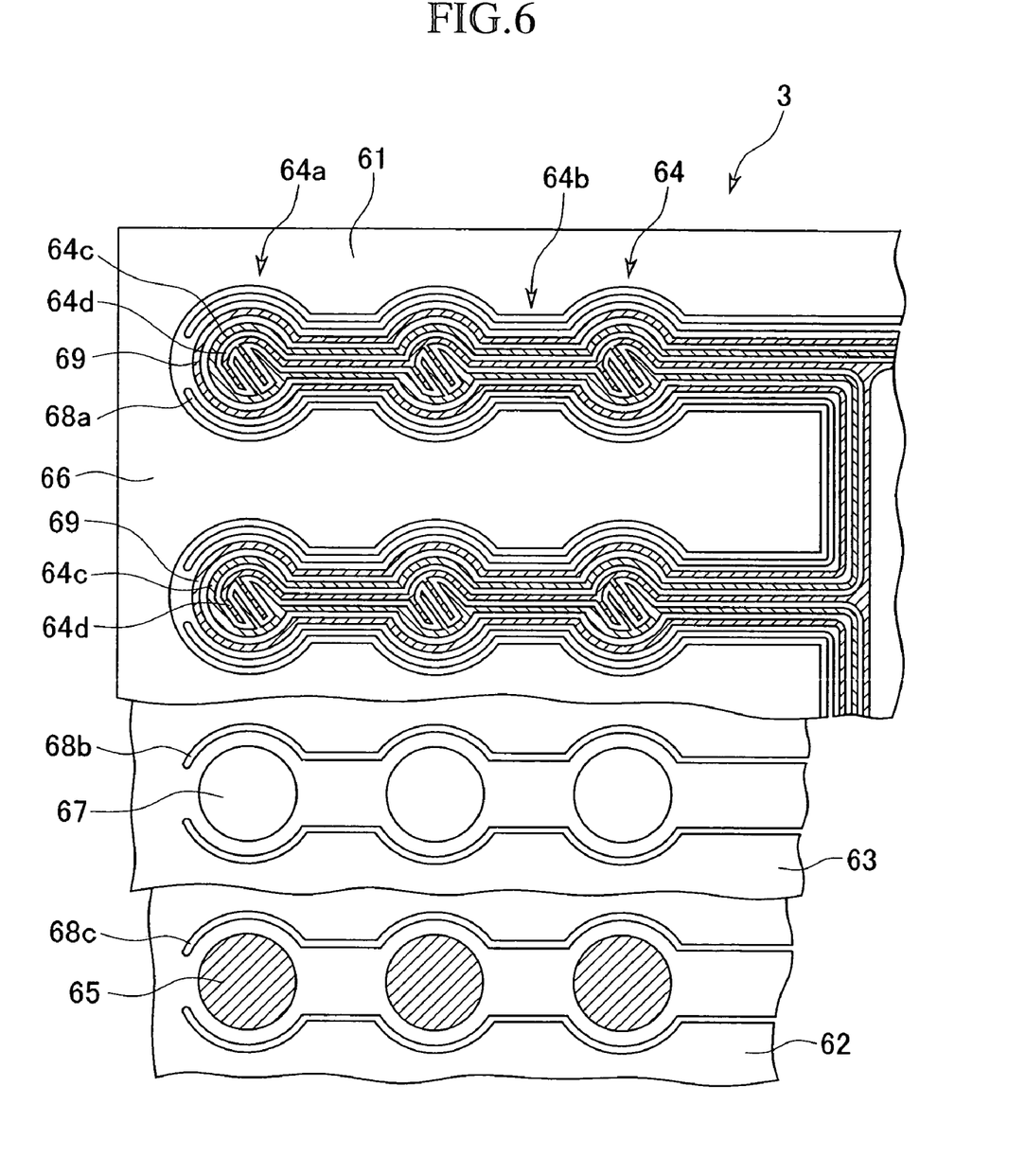
FIG. 6 is a plan view showing a hybrid sensor according to a third exemplary embodiment of the present invention.
Figure 7:
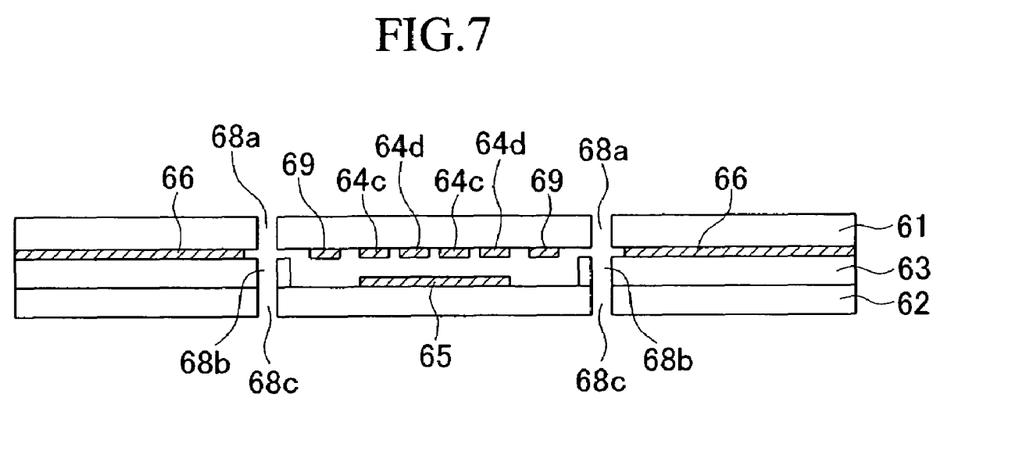
FIG. 7 is a cross-sectional view showing the hybrid sensor according to the third exemplary embodiment of the present invention.

FIGS. 6 and 7 show a third exemplary embodiment of the present invention. Structural elements similar to or the same as the first and second embodiments bear the same reference numerals and explanations thereof are omitted.

The hybrid sensor 3 according to the third embodiment includes upper and lower flexible sheets 61 and 62 and an insulating sheet 63 positioned between the upper and lower flexible sheets 61 and 62. The upper flexible sheet 61 is provided with electrode patterns 64 which include a switching electrode pattern 64c, a ground electrode pattern 64d and a guard electrode pattern 69 on its lower surface facing the insulating sheet 63. In FIG. 6, the electrode patterns 64 are drawn by solid lines for clarification. The electrode patterns 64 has, similar to the first and second embodiments, land portions 64a and lead portions 64b. At the land portions 64a, the switching electrode pattern 64c and the ground electrode pattern 64d are configured with comb teeth which face each other. The guard electrode pattern 69 is arranged on the outer peripherals of the switching electrode pattern 64c to surround the pattern 64c at both the land portions 64a and the lead portions 64b.

The lower flexible sheet 62 is provided with a plurality of short-circuiting patterns 65 arranged in a matrix form at positions corresponding to the land patterns 64a of the electrode patterns 64 of the upper flexible sheet 61.

The insulating sheet 63 has a plurality of openings 67 at positions corresponding to the land portions 64a and the short-circuiting patterns 65. Each of the openings 67 has a diameter sufficient to enable one of the land portions 64a to contact the associated one of the short-circuiting patterns 65 when a pressure load is applied to the sensor 3.

The upper and lower flexible sheets 61 and 62 and the insulating sheet 63 are further provided with slits 68a, 68c and 68b, respectively. The slits 68a on the flexible sheet 61 are formed the outer peripheral of the guard electrode pattern 69 to surround the pattern 69. Thus, the slits 68a separate the area where the electrode patterns 64 are formed from other portions of the upper flexible sheet 61 except for non-slit formed portions on the left side in FIG. 6. The slits 68b and 68c are formed at the outer periphery of the openings 67 on the insulating sheet 63 and the short-circuiting patterns 65 on the lower flexible sheet 62, respectively, to surround them. When the upper and lower flexible sheets 61 and 62 and the insulating sheet 63 are stacked together, the slits 68a, 68b and 68c are overlapped to form through slits.

At the outer peripheral of the slits 68a on the upper flexible sheet 61, a detecting electrode pattern 66 is formed to surround the slits 68a. As shown in FIG. 6, the detecting electrode pattern 66 is formed to cover substantially the entire area other than the area where the electrode patterns 64 and slits 68a are formed. The detecting electrode pattern 66 thus formed has a large detecting area contributing to the detection of a nearby object. When an object reaches the detecting electrode pattern 66, a capacitance Cx generated between the object and the detecting electrode pattern 66 is increased. The object has a ground capacitance which is much greater than the capacitance Cx to be detected so that the potential of the object can be regarded as the ground potential. The change in the capacitance Cx is thus detectable.

The hybrid sensor 3 is connected to a sensor circuit which is similar to the sensor circuit 50 shown in FIG. 3. That is, the switching electrode pattern 64c is connected to the terminal "a", the detecting electrode pattern 66 is connected to the terminal b, the ground electrode pattern 64b is connected to the terminal c, and the guard electrode pattern 69 is connected to the terminal d, of the sensor circuit 50.

In this embodiment, the electrode patterns 64, which may be called a membrane switch, are separated from the area formed with the detecting electrode pattern 66 by the slits 68a. This structure prevents misoperation of the hybrid sensor 3 caused by bending force applied to the hybrid sensor 3 when the hybrid sensor 3 is installed in a curved place.

As described above, the hybrid sensor according to the present invention has the detecting electrode pattern provided to cover substantially the entire area other than the area on which the switching electrode pattern is formed. Therefore, the detecting electrode pattern has a large detecting area contributing to detect a nearby object. This structure makes it possible to improve the sensitivity of the electrostatic capacitance sensor.

Furthermore, the electrostatic capacitance sensor in the hybrid sensor according to the present invention has a guard electrode pattern arranged to locate the area or space between the detecting electrode pattern and the other electrode patterns. The guard electrode pattern is applied with a voltage equal to the voltage of the detecting electrode pattern. Thus, the detecting electrode pattern is isolated from the other electrode patterns in terms of the electrostatic capacitance. This structure makes it possible to avoid degradation of the sensitivity of the electrostatic capacitance sensor even if a plurality of functions are provided on the hybrid sensor.

While exemplary embodiments of the invention have been described and illustrated above, it should be understood that these are merely exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A hybrid sensor comprising:
 a plurality of stacked, flexible sheets;
 wherein a first sheet of the plurality of flexible sheets comprises:
  a switching electrode pattern and a ground electrode pattern, together forming a plurality of land portions,
  a detecting electrode pattern, wherein the detecting electrode pattern substantially covers the entire area surrounding the switching electrode pattern of the first sheet, and a plurality of slits surrounding the land portions and separating the land portions from the detecting electrode pattern.

2. The hybrid sensor according to claim 1, wherein:

a second sheet of the plurality of flexible sheets comprises a insulating sheet having a plurality of holes therein;

a third sheet of the plurality of flexible sheets comprises a conductive short circuit pattern; and wherein the location of the holes in the second sheet and the location of the short circuit pattern on the third sheet correspond to the location of the land portions of the switching electrode pattern and the ground electrode pattern on the first sheet.

3. The hybrid sensor according to claim 2, wherein:

the first sheet further comprises a first plurality of slits surrounding the land portions and separating the land portions from the detecting electrode pattern;

the second sheet further comprises a second plurality of slits surrounding the holes;

the third sheet further comprises a third plurality of slits surrounding the short circuit pattern; and the locations of the first, second, and third slits correspond such that when the first, second, and third sheets are stacked together, the first, second, and third slits form through slits.

4. The hybrid sensor according to claim 2, wherein:

the switching electrode pattern and the ground electrode pattern are formed on an underside of the first sheet, facing the second and third sheets, and the short circuit pattern is formed on a topside of the third sheet, facing the second and first sheets, such that when pressure is applied to the first and third sheets, the switching electrode pattern and the ground electrode pattern contact the short circuit pattern through the holes in the second sheet.

5. The hybrid sensor according to claim 1 wherein the first sheet further comprises:

a guard electrode pattern, supplied with the same electric potential as supplied to the detecting electrode pattern and positioned on the first sheet in order to block parasitic capacitance between the detecting electrode pattern and the switching electrode pattern.

6. The hybrid sensor according to claim 5, wherein:

the first sheet further comprises a first plurality of slits surrounding the land portions and the guard electrode pattern and separating the land portions and the guard electrode pattern from the detecting electrode pattern;

the second sheet further comprises a second plurality of slits surrounding the holes;

the third sheet further comprises a third plurality of slits surrounding the short circuit pattern; and the locations of the first, second, and third slits correspond such that when the first, second, and third sheets are stacked together, the first, second, and third slits form through slits.

7. A hybrid sensor comprising:

a first flexible sheet provided with a switching electrode pattern and a ground electrode pattern on a first surface of said flexible sheet, a guard electrode pattern positioned to surround said switching and ground electrode patterns and a detecting electrode pattern to surround said guard electrode pattern, said switching electrode pattern, said ground electrode pattern and said guard electrode pattern being formed on a first area on said first flexible sheet while said detecting electrode pattern being formed on a second area other than said first area on said first flexible sheet, said second area covering substantially the entire are other than said first area in said first flexible sheet;

a second flexible sheet provided with a short-circuiting electrode pattern on a surface facing said first surface of said first flexible sheet; and an insulating sheet located between said first and second flexible sheets and having a plurality of openings corresponding to said switching and ground electrode patterns and said short-circuiting electrode pattern;

wherein the first flexible sheet further comprises a plurality of slits surrounding the first area and separating the first area from the second area.

* * * * *